United States Patent
Hsu et al.

(10) Patent No.: US 7,375,854 B2
(45) Date of Patent: May 20, 2008

(54) METHOD FOR COLOR CORRECTION

(75) Inventors: Ching-Hsiang Hsu, Taipei (TW);
Yuh-Ren Shen, Tainan (TW);
Ling-Chih Lu, Hsinchu Hsien (TW)

(73) Assignee: Vastview Technology, Inc., Hsinchu (TW)

( * ) Notice: Subject to any disclaimer, the term of this patent is extended or adjusted under 35 U.S.C. 154(b) by 770 days.

(21) Appl. No.: 10/798,867

(22) Filed: Mar. 12, 2004

(65) Prior Publication Data
US 2005/0201615 A1 Sep. 15, 2005

(51) Int. Cl.
*G06F 15/00* (2006.01)
*G03F 3/08* (2006.01)
*G06K 9/00* (2006.01)

(52) U.S. Cl. .................. 358/1.9; 358/519; 382/167

(58) Field of Classification Search .............. 358/1.9, 358/518, 520, 534, 3.02, 519, 530; 382/167, 382/162, 274
See application file for complete search history.

(56) References Cited

U.S. PATENT DOCUMENTS

| | | | | |
|---|---|---|---|---|
| 6,462,835 B1 * | 10/2002 | Loushin et al. | .............. | 358/1.9 |
| 6,686,953 B1 * | 2/2004 | Holmes | ....................... | 348/179 |
| 6,963,668 B2 * | 11/2005 | Engeldrum et al. | ......... | 382/233 |
| 7,110,001 B2 * | 9/2006 | Sasaki | ........................ | 345/590 |
| 7,205,970 B2 * | 4/2007 | Kim et al. | ..................... | 345/89 |
| 2005/0057473 A1 * | 3/2005 | Hsu et al. | ..................... | 345/89 |
| 2006/0033695 A1 * | 2/2006 | Kudo et al. | .................... | 345/89 |
| 2006/0146066 A1 * | 7/2006 | Sasaki | ........................ | 345/590 |
| 2007/0001952 A1 * | 1/2007 | Lee | ............................ | 345/88 |
| 2007/0036457 A1 * | 2/2007 | Saquib et al. | ............... | 382/274 |
| 2007/0122027 A1 * | 5/2007 | Kunita et al. | ............... | 382/154 |

* cited by examiner

*Primary Examiner*—Madeleine A V Nguyen

(57) ABSTRACT

A method for color correction is provided. In this method, a plurality of groups of gray levels and luminance of light source of display device are respectively selected by color measurement system. The selected data of each color light are respectively calculated to obtain fitting functions which can fit the gray level data of each interval. The fitting luminance of the gray levels in interval is obtained by the fitting function and formed into a lookup table. Then in order to correspond a gamma curve of normalized gray data of image to a predetermined target curve, the two gamma curves are first taken to logarithmic calculation and the modified gray signals are obtained from the lookup table, then the modified gray signals are transmitted out for providing the display device to express the gray distribution state. The method for color correction is applicable to various display devices, especially liquid crystal display device.

13 Claims, 5 Drawing Sheets

METHOD FOR COLOR CORRECTION

BACKGROUND OF THE INVENTION

1. Field of the Invention

The present invention is related to a method for color correction, and particularly to a method for color correction which can modify the original luminance distribution state of image data. In this method, the fitting luminance is obtained by a fitting function of an interval and formed into a lookup table, and the modified gray signals can be quickly obtained from the lookup table to adjust the gray distribution state of display. The present invention is especially applicable to the color image processing of liquid crystal displays.

2. Description of the Prior Art

Liquid crystal display (LCD) is a planar display in optoelectrical products. It possesses many advantages such as small, light, thin, low power consumption, no flicker and no radiation etc. There are some problems such as overlong response time and afterimage due to properties of liquid crystal molecule such as viscosity, dielectric constant and elastic constant in image processing of display. Therefore, it is needed to improve image quality by improved driving methods wherein the active matrix driving method possesses the most industrial value among the driving methods. It has an additional active element at the intersection of the existing electrodes for disposing picture element in the active matrix driving method. One of the active matrix driving methods is the most popular thin film transistor (TFT) technology. There is an opposite electrode added to the intersection of the existing electrodes for disposing picture element and a thin film active element is placed at the intersection of the three electrodes on the panel of the TFT liquid crystal display.

Each picture element (pixel) of LCD panel can produce red, green and blue color (RGB). In fact, the liquid crystal has no color itself. Color is produced by light passing through the color filter on the LCD panel. The brightness of color is controlled by the quantity of the light passing through the pixel. The brightness scale unconcerned with the color filter is generally called "gray level". The gray level is determined by the voltage produced by the driving element in the liquid crystal display. An 8 bits driving element can transmit 256 gray level voltages and the middle gray levels are determined by the middle voltages produced by the driving element. However, the light transmission of the liquid crystal is nonlinear, so the voltage must be modified to produce uniform distribution of gray level. The input and output relation of the voltage and pixel brightness is approximately a curve function: light output=(input voltage)$^\gamma$, wherein $\gamma$ (gamma) is a parameter. The corresponding relation of gray level and brightness (or luminance) is a curve called "gamma curve" as shown in FIG. 1A. The gamma curves of the three colors light of RGB corresponding to gray level are shown in FIG. 1B. The original gray level data of the gamma curve are generally normalized to produce gamma curves of three color lights with the same start point and end point, as shown in FIG. 1C. In general, the color correction of images is based on the normalized gamma curves.

In order to produce the best color display on the panel, i.e. the best gamma curve expression for a driving chip with a driving method, the luminance of the panel must first be measured by the color measurement system or device and the original gray level data are processed by the driving chip. In the prior technology, the color measurement system must measure 768 numbers of luminance for an 8 bits display panel to produce gamma curves. It will take a long time. Therefore, the present inventor invents a new and effective color correction method which can greatly shorten the color measurement time, speed up color production and make rich color.

Additionally, an 8 bits controller can produce 256 numbers of gray levels for liquid crystal display. Because a pixel has 256 numbers of gray levels for each primary color, so each pixel can display 256×256×256, i.e. 16,777,216 colors. However, it still can not satisfy human's demand for color. Although human's eye can not find the difference of color change in dynamic display on display, but in static display human's eye can find that the gray level change is not smooth enough. In order to solve this problem, a frame rate control (FRC) technology is then developed. In this technology, a picture is divided into several frames in a picture displaying time. When the luminance switches between the darker and the brighter in the switching process of image data, the pixel can produce middle luminance to make gray level expression smoother and make color display richer in the switching process. If two neighboring pixels open or close at the same time in the image color switching process, there will occur a flicker phenomenon which results in people's uncomfortableness. The two neighboring pixels must have two different gray levels for eliminating the flicker phenomenon. The method for producing different gray level is that the original gray level of the original gamma curve can be correlated to a target curve which could be established according to the characteristic of the LCD panel or one of the RGB gamma curve. The correlated gray level of target curve is then processed by FRC technology and then the corrected luminance is displayed on display device. In the prior art, the color processing method consists of the steps shown in FIG. 2. The luminance of the target curve corresponding to the original gray level of a color gamma curve is found by step 1 and step 2. Thereafter, the correlated luminance can be showed by gray level 128.5 of the original gamma curve according to step 3. Because the gray level 128.5 is between 128 and 129, it needs to extend 8 bits of operation to 9 bits to display the correspondent luminance by linear interpolation. If the middle gray level is between 128.5 and 129 or 128 and 128.5, the operation bit must be above 10 bits. It is a heavy burden to hardware, and the operation by linear interpolation can not be quick and correct to correspond to the target curve.

Therefore, the present inventor provides an improved method which can overcome the shortcomings stated above and make the image data processes more quickly and color displayed more rich.

SUMMARY OF THE INVENTION

The main object of the present invention is to provide a method for color correction which can quickly obtain the luminance of the image data and decrease the time of color measurement.

The another object of the present invention is to provide a method for color correction which can quickly obtain the modified luminance of image to make the display device able to distribute the gray state according to the modified gray signals and make the color expression of the display device more plentiful, and the resolution of the image is not reduced.

To achieve the said objects, the method for color correction of the present invention executes the numerical calculation for the selected data of each color light to obtain the fitting functions which fit the gray level data in each interval. The fitting luminance of gray levels in the interval can be obtained from the fitting functions and formed into a lookup table. Then, a gamma curve can be obtained after the image gray data transmitted in are normalized. The gamma curve is corresponded to a predetermined target curve. In the corresponding process first it takes logarithmic operation of the two gamma curves and obtains modified gray signals from the lookup table, then the modified gray signals are processed by FRC technology for the display device to express the gray distribution state. The present invention is particularly applicable to various liquid crystal displays.

The present invention will be apparent after reading the detailed description of the preferred embodiments thereof in reference to the accompanying drawings.

DETAILED DESCRIPTION OF THE PREFERRED EMBODIMENT

Figure 1A:
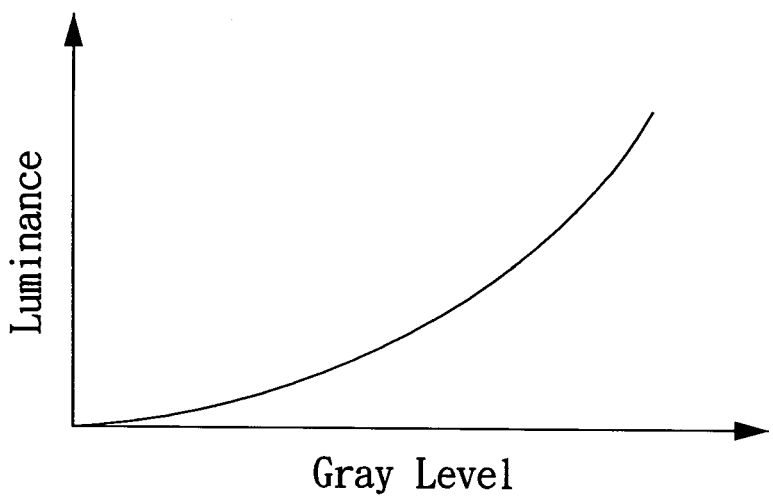
FIG. 1A is a schematic view of a prior gamma curve.
Figure 1B:
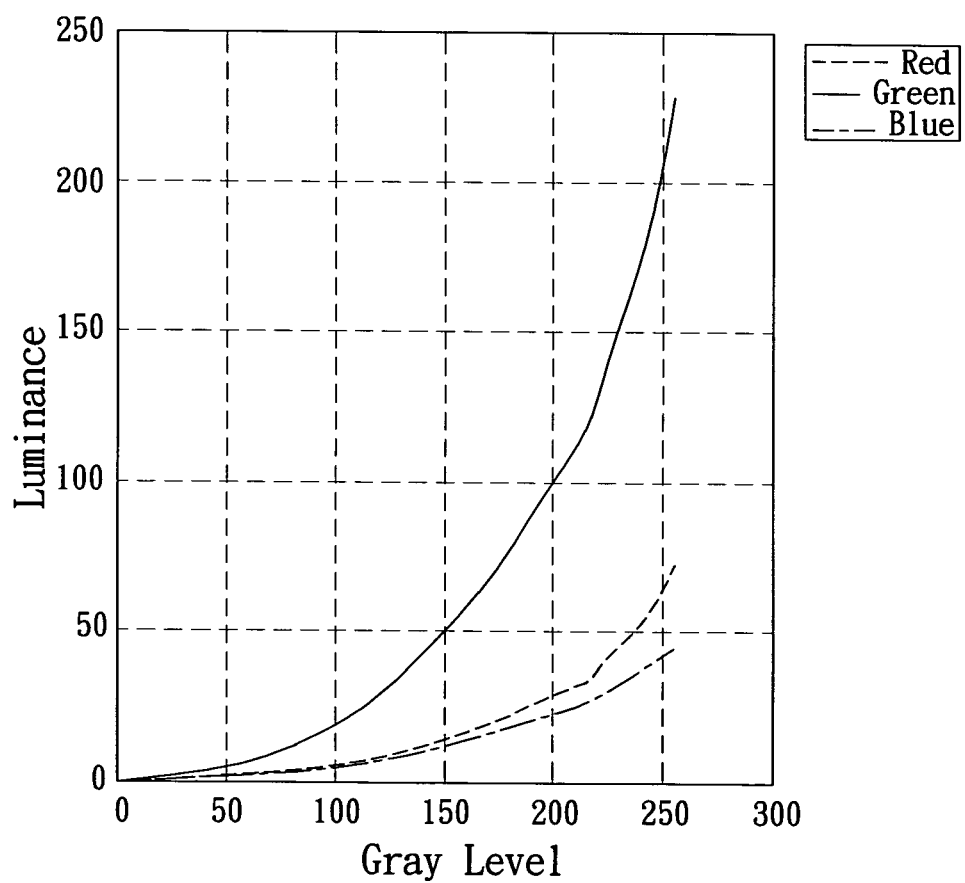
FIG. 1B is a schematic view of original gamma curves of different color lights.
Figure 1C:
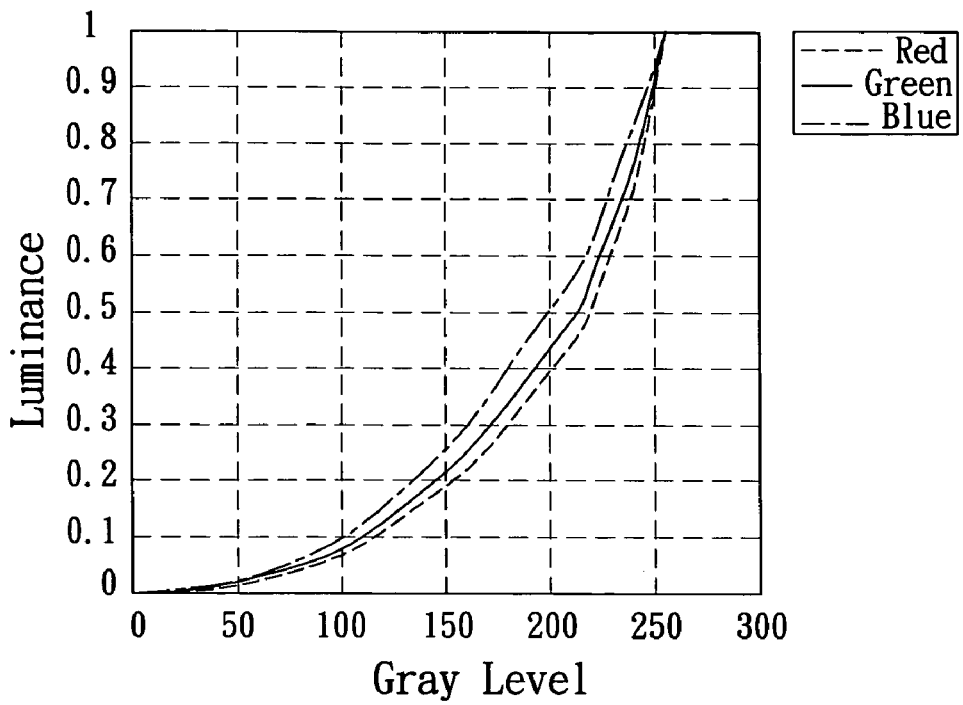
FIG. 1C is a schematic view of normalized gamma curves of different color lights.
Figure 2:
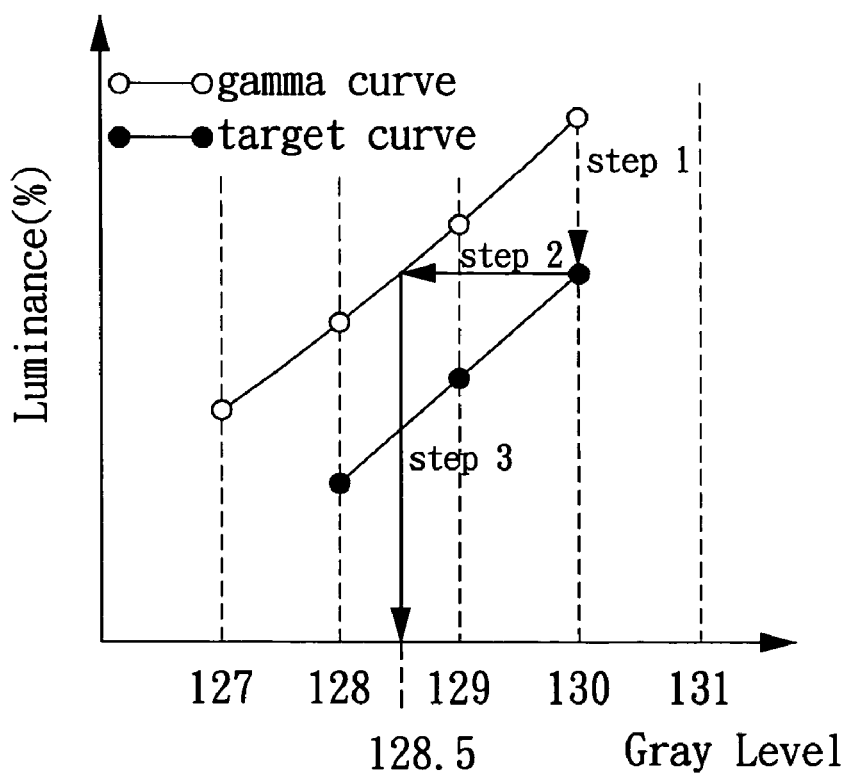
FIG. 2 is a schematic view of a method for a gamma curve corresponding to a target curve in prior art.

A liquid crystal display is taken as an example. To modify the luminance of the liquid crystal display panel, the gray levels of different color lights are transmitted in and the luminance on liquid crystal display panel are measured by a color measurement device or system so that the gamma curve of each color light is produced as shown in FIG. 1B and is normalized as shown in FIG. 1C. In the present invention, the 256 numbers of gray levels and luminance of each color light are not all processed, but only N groups of gray level data are taken to calculate for gamma curve, N is integer and is between 2 and a maximum which the display device can display. The measurement speed is quicker but the accuracy is worse as N is decreasing. The measurement time is longer but the accuracy is higher as N is increasing. For the display device with RGB color light source, the preferred quantity of groups selected is 30 including:

the measured gray levels of red light: 0, 31, 63, 95, 127, 159, 191, 207, 223, 239, 255;

the measured gray levels of green light: 31, 63, 95, 127, 159, 191, 207, 223, 239, 255; and the measured gray levels of blue light: 30, 63, 96, 129, 162, 195, 215, 235, 255.

After the luminance (Q) of the gray levels (P) mentioned above is measured, each n groups of data are taken as one interval, n is positive integer and between 2 and N. If an interval has two measured gray data, then the maximum of the luminance and the maximum of the gray levels are taken into logarithmic function respectively and the former is divided by the latter to produce a gamma parameter function (a), i.e:

$$\gamma = \log Q_{max} / \log P_{max} \qquad (a)$$

and then a polynomial function of the gamma parameter $Q = a\,P^\gamma + b$ is produced by fitting all selected data of the interval to get the coefficients a and b. Each interval can have a polynomial function fitting its data by the steps mentioned above. By the fitting function of each interval of each color light the fitting luminance of each gray level in each interval can be obtained and are formed into a lookup table for use in color processing or correction afterwards.

If an interval has 3 groups of gray data, a gamma parameter can be gotten by taking the maximum of the luminance and the maximum of the gray level in the interval into function (a). Then a polynomial function of the gamma parameter $Q = aP^\gamma + bP + c$ can be obtained by fitting all selected data of interval to get coefficients a, b and c. Each interval can have a polynomial function and the polynomial function is stored.

If an interval has n groups of gray data, n is a positive integer and $2 \leq n \leq N$, gamma parameters can be gotten by taking the maximum value of neighboring two luminance and gray level in the interval into function (a). Then a polynomial function (b):

$$Q = \sum_{m=2}^{n} a_m P^{\gamma_m} + a_1 P + a_0 \qquad (b)$$

can be obtained by fitting all data of interval to get coefficients $a_m$, $a_1$, $a_0$, and let $a_{n-1}=0$. The values of $\gamma_m$ are determined by the gray data of each interval. Taking n=4 as an example, $Q = a_4 P^{\gamma_4} + a_2 P^{\gamma_2} + a_1 P + a_0$, wherein one interval of red light gray levels 207, 223, 239 and 255. The $\gamma_4$ is determined by taking gray level 255 and its luminance into gamma parameter function (a). The $\gamma_2$ is determined by gray level 239 and its luminance. The $\gamma_1$ is determined by gray level 223 and its luminance. Then the polynomial function (b) can be obtained by taking the four gray levels and their luminance into Q function to get each coefficient. By the polynomial functions of each interval of each color light, the fitting luminance of each gray level in interval can be obtained and be formed into a lookup table for use in color processing afterwards.

Figure 5:
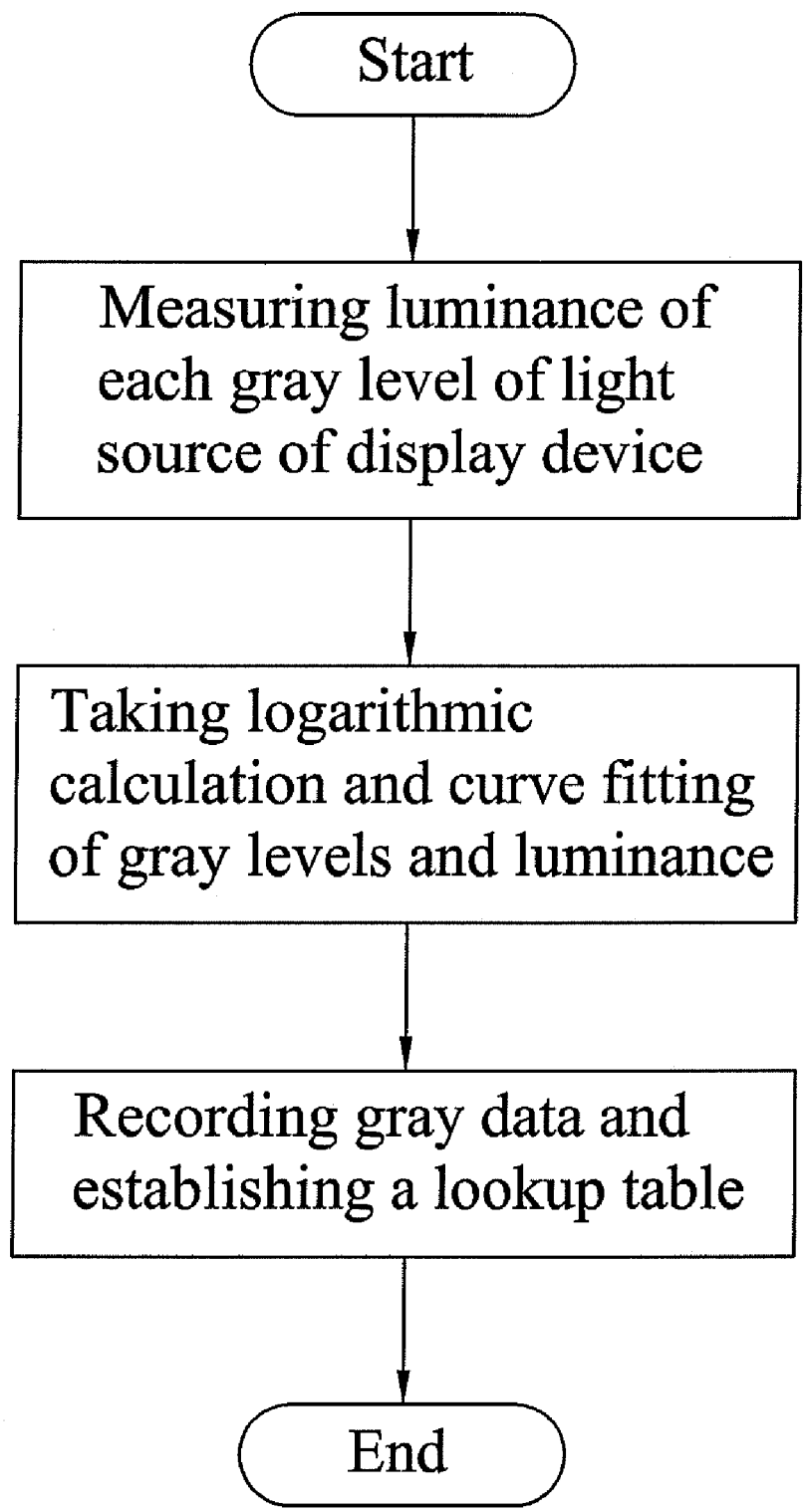
FIG. 5 is a flowchart for establishing a lookup table of fitting luminance of gray levels of each color light by the color correction method of the present invention.

The steps mentioned above can be shown by a flowchart as FIG. 5. A complete lookup table can be established by executing the steps of the flowchart. In other words, the lookup table is established from different gamma parameter, different gray level and correspondent luminance. Through the comparison of experimental data, the error between the gamma curve obtained by this method and the gamma curve obtained by measurement is less than the tolerance of the measurement device. Therefore, the color correction method of this curve fitting not only decrease the time of measuring display but also increase the accuracy of the measurement. The method for color correction can be applicable to the displays device such as liquid crystal display, projector, and plasma display etc.

Moreover, after the original gray data of images are transmitted into display device, supposing the gamma function of the image data is the function of γ parameter:

$$Y = X^\gamma \quad \text{(c)}$$

wherein X, Y is respectively gray level and luminance of gray signal and the gamma curve function will be corresponded to a predetermined target curve function:

$$Yt = Xt^{\gamma'} \quad \text{(d)}$$

wherein Yt is target luminance, γ' is the gamma parameter of the target curve, the display device can processes color performance according to the modified gray signals by the following method:

Take logarithmic calculation of functions (c) and (d) and let Xt=X, $$\log Y = \gamma \log X \quad \text{(c')}$$

$$\log Yt = \gamma' \log X \quad \text{(d')}$$

(d') is divided by (c') to get function(e):

$$\log Yt = (\gamma'/\gamma) \log Y \quad \text{(e)}$$

Figure 3:
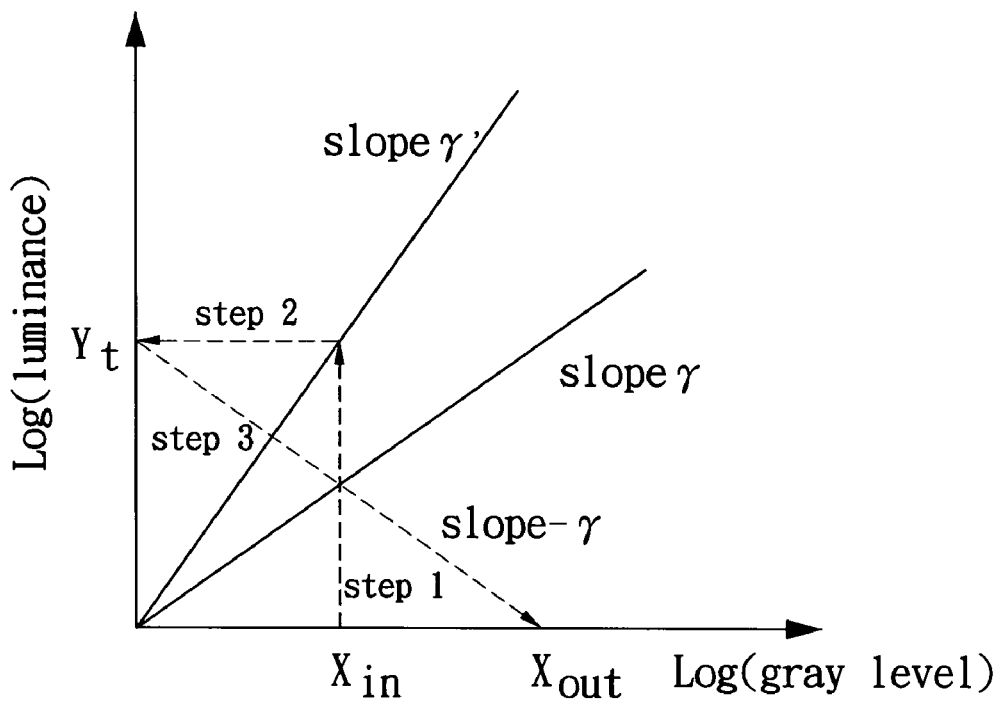
FIG. 3 is a schematic view of steps for corresponding transmitted gray level to the target curve according to the present invention.
Figure 6:
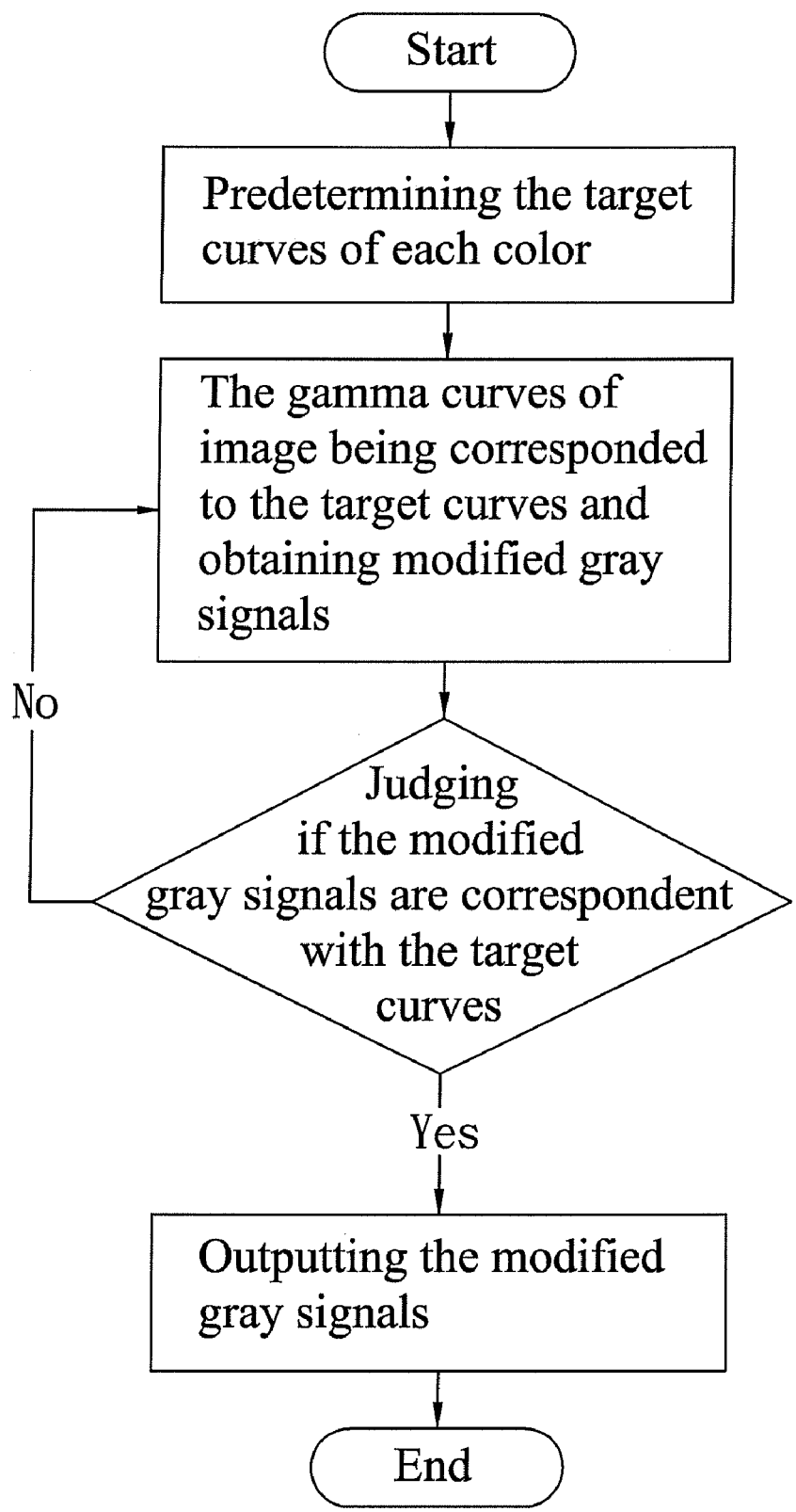
FIG. 6 is a flowchart for outputting the modified gray signals of each color light by the correction method of the present invention.

The target luminance Yt can be obtained from function (e). Its coordinate representation is shown in FIG. 3, wherein the logarithmic coordinate axis is respectively gray level and luminance, the values of function (c') and (d') are represented by two lines with γ and γ' slope, respectively. After the gray level Xin of image data is transmitted in, the target luminance Yt can be found through step 1 and step 2 and Xout on abscissa can be obtained through a line with slope −γ' by step 3. Then a corresponding transitional luminance Yn can be obtained by taking the original gray level Xout as a transitional gray level Xn to consult the lookup table established as stated above. If the difference between Yn with Yt is smaller than a tolerable error, then the Yt and Xt are substituted by the Yn and Xn, respectively. If the difference between Yn with Yt is larger than a tolerable error, then the steps mentioned above are repeated until the difference between Yn and Yt is smaller than a tolerable error. Finally, the modified gray signal that displays the target gray level Xt is transmitted out and the modified gray signal can be displayed by a FRC technology. The flowchart of the steps mentioned above is shown in FIG. 6. The accuracy of the gray level obtained by these steps is determined by the different gamma parameter, different gray levels and corresponding luminance from the lookup table mentioned above. It is not limited by the hardware, so the color performance can be richer and display device can perform the gray distribution state according to the lookup table consisted of the original gray data signals and the corresponding modified gray signals.

Figure 4:
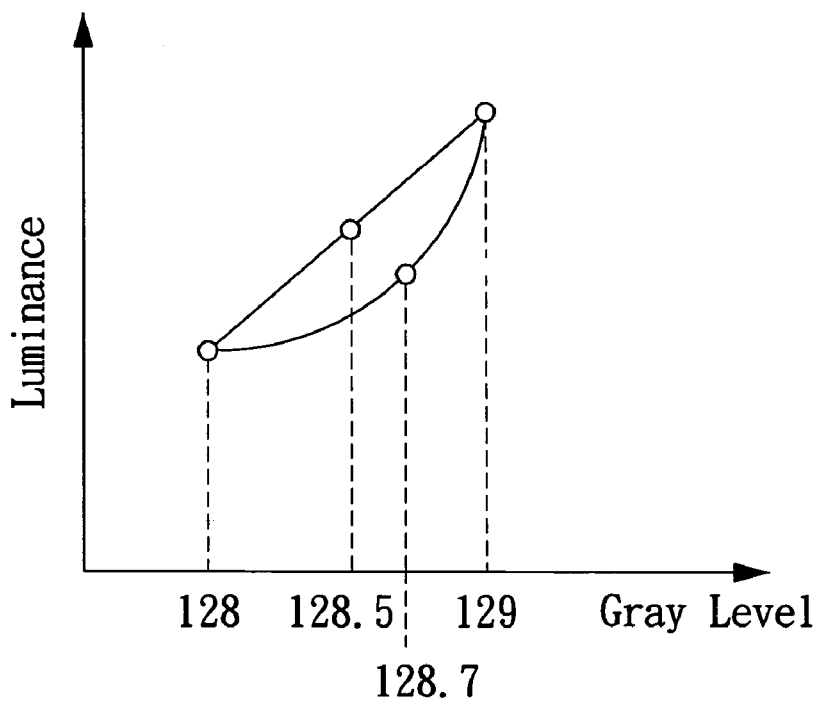
FIG. 4 is a schematic view for comparing the method for color correction of the present invention with which of the prior art.

Referring to FIG. 4, although a device of 9 bits can process gray level of 128.5 by linear interpolation, but if the gray level is 128.7, it will be regarded as 128.5 to be transmitted out and displayed. As for the method according to the present invention, it can directly process the gray level of 128.7 by FRC technology to obtain the accurate gray level output.

Therefore, the present invention has the following advantages:

1. The method for color correction according to the present invention can shorten the measurement time of display color and its error is smaller than the tolerance of the measurement device, so it is of great value in industry.

2. The method for color correction according to the present invention can make the color expression more plentiful and does not decrease the resolution of picture, so it makes display gaily-colored and stereognostic.

As stated in the above disclosed, the present invention can surely achieve its expected objects to provide a method for color correction that can speed up the correction process and make the color more plentiful and stereognostic, it has its industrial practical value. Having thus described my invention, what I claim as new and desire to be secured by Letters Patent of the United States are:

What is claimed is:

1. A method for color correction including:
   (1) the gray levels and the luminance values of a light source of a display device being measured by a color measurement system;
   (2) the gray levels and luminance values being normalized and N groups of gray levels (P) and luminance values (Q) being selected, wherein N is a positive integer and 2≦N≦maximum of what the display device can display;
   (3) each n groups of selected values being taken as an interval, wherein n is a positive integer and 2≦n ≦N;
   (4) the gray levels (P) and the luminance values (Q) of each interval being executed by logarithmic and divisional operations to obtain a gamma parameter: γ=log Q/log P, then a fitting function of the gamma parameter for each interval being able to be obtained, which can fit all selected data of the interval;
   (5) a fitting luminance value of each gray level in interval being able to be obtained from the fitting function of the gamma parameter for each interval of each color light of the light source, and then a lookup table consisted of gray levels and their corresponding fitting luminance values being able to be made;
   (6) original gray data of an image being normalized to obtain a gamma curve consisted of gray levels (X) and luminance values (Y) of each color light of the light source, where the function of the gamma curve is $Y=X^\gamma$, and γ represents the gamma parameter;
   (7) the image gray signals of the function of the gamma curve $Y=X^\gamma$ being corresponded to a function of a predetermined target curve $Yt=Xt^{\gamma'}$, letting Xt=X and obtaining a modified gray signals by an iteration method, its steps including:
      (a) the gamma curve function and the target curve function being executed logarithmic and divisional operations, i.e. log Yt=(γ'/γ)log Y, to obtain a target luminance value Yt;
      (b) obtaining a transitional luminance value Yn corresponding with transitional gray levels Xn from the lookup table;
      (c) comparing the transitional luminance value Yn with the target luminance value Yt, if the difference between them is smaller than a tolerable error, then the target luminance value Yt and the target gray level Xt being substituted by the transitional luminance value Yn and transitional gray level Xn, respectively, if the difference between them being larger than a tolerable error, then the steps (a) to (c) mentioned above being repeated; and
      (d) transmitting the gray signals processed through steps (a) to (c), and the display device expressing a gray distribution state according to the modified gray signals.

2. The method for color correction as claimed in claim 1, wherein the light source includes red, green and blue (RGB) color lights.

3. The method for color correction as claimed in claim 1, wherein maximum gray level and luminance value are taken from the gray levels and luminance values in neighboring intervals to obtain a gamma parameters, i.e. $\gamma = \log Q_{max}/\log P_{max}$.

4. The method for color correction as claimed in claim 1, wherein the fitting function is a polynomial function of the gamma parameter $$Q = \sum_{m=2}^{n} a_m P^{\gamma_m} + a_1 P + a_0,$$

n being a positive integer and $2 \leq n \leq N$, $a_{n-1}=0$, $a_m$, $a_1$ and $a_0$ being the coefficients of the function, $\gamma_m$ being determined by the gray levels (P) and luminance values (Y) of each interval.

5. A method for color correction including:
(1) the gray levels and the luminance values of a light source of a display device being measured by a color measurement system;
(2) the gray levels and luminance values being normalized and N groups of gray levels (P) and luminance values (Q) being selected, wherein N is a positive integer and $2 \leq N \leq$ maximum of what the display device can display;
(3) each n groups of selected values being taken as an interval, wherein n is a positive integer and $2 \leq N \leq$;
(4) the gray levels (P) and luminance values (Q) of each interval being executed by logarithmic and divisional operations to obtain a gamma parameter: $\gamma = \log Q/\log P$, then a fitting function of the gamma parameter for each interval being able to be obtained, which can fit all selected data of the interval; and
(5) a fitting luminance value of each gray level in interval being able to be obtained from the fitting function of each interval of each color light, thereby the display device being able to express the gray distribution state according to the modified gray levels and luminance values.

6. The method for color correction as claimed in claim 5, wherein the maximum of neighboring gray levels and luminance values in each interval are taken to obtain the gamma parameter, i.e. $\gamma = \log Q_{max}/\log P_{max}$.

7. The method for color correction as claimed in claim 5, wherein the fitting function is a polynomial function of the gamma parameter $$Q = \sum_{m=2}^{n} a_m P^{\gamma_m} + a_1 P + a_0,$$

n being a positive integer and $2 \leq n \leq N$, $a_{n-1}=0$, $a_m$, $a_1$ and $a_0$ being the coefficients of the fitting function, $\gamma_m$ being determined by the gray levels of each interval.

8. The method for color correction as claimed in claim 5, wherein the light source are red, green and blue color lights, the measured gray levels of red light being: 0, 31, 63, 95, 127, 159, 191, 207, 223, 239, 255, the measured gray levels of green light being: 31, 63, 95, 127, 159, 191, 207, 223, 239, 255, and the measured gray levels of blue light being: 30, 63, 96, 129, 162, 195, 215, 235, 255.

9. The method for color correction as claimed in claim 5, wherein the display device is a liquid crystal display device.

10. The method for color correction as claimed in claim 5, wherein the display device is a projector.

11. The method for color correction as claimed in claim 5, wherein the display device is a plasma display panel.

12. A method for color correction including:
(1) the image gray signals of gamma curve function $Y=X^\gamma$ being corresponded to a predetermined target curve function $Yt=Xt^{\gamma'}$, letting $Xt=X$ and obtaining a modified gray signals by an iteration method, its steps including:
(a) the gamma curve function and the target curve function being executed by logarithmic and divisional operations, i.e. $\log Yt = (\gamma'/\gamma) \log Y$ to obtain the target luminance value Yt;
(b) obtaining the transitional luminance value Yn corresponding with the transitional gray levels Xn from a lookup table;
(c) comparing the transitional luminance value Yn with the target luminance value Yt, if the difference between them is smaller than a tolerable error, then the Yt and Xt being substituted by the Yn and Xn, respectively, if the difference between them being larger than a tolerable error, then the steps mentioned above being repeated;
(d) the modified gray signals containing target gray levels Xt being transmitted out; and
(2) the modified gray signals being transmitted out, and then the display device being able to express the gray distribution state according to the modified gray signals.

13. The method for color correction as claimed in claim 12, wherein the lookup table containing the luminance value corresponding with each gray level being able to be adjusted and obtained by a user.

* * * * *